US008081380B2

(12) United States Patent
McKinley

(10) Patent No.: US 8,081,380 B2
(45) Date of Patent: Dec. 20, 2011

(54) STEREOSCOPIC ZOOM ENDOSCOPE

(76) Inventor: Harry R. McKinley, South Dartmouth, MA (US)

( * ) Notice: Subject to any disclaimer, the term of this patent is extended or adjusted under 35 U.S.C. 154(b) by 733 days.

(21) Appl. No.: 11/870,005

(22) Filed: Oct. 10, 2007

(65) Prior Publication Data

US 2009/0096865 A1 Apr. 16, 2009

(51) Int. Cl.
*G02B 21/22* (2006.01)
*G02B 27/22* (2006.01)
*A61B 1/04* (2006.01)

(52) U.S. Cl. ........ 359/462; 359/376; 359/377; 359/378; 359/676; 348/45

(58) Field of Classification Search .................. 359/375, 359/376, 377, 378, 380, 666, 421, 695, 823, 359/689, 690, 462, 676; 600/113, 146, 173; 348/45

See application file for complete search history.

(56) References Cited

U.S. PATENT DOCUMENTS

| | | | | |
|---|---|---|---|---|
| 3,353,892 A | * | 11/1967 | Minns et al. | 359/377 |
| 4,506,958 A | * | 3/1985 | Imai | 359/690 |
| 5,673,147 A | * | 9/1997 | McKinley | 359/462 |
| 5,751,341 A | * | 5/1998 | Chaleki et al. | 348/65 |
| 5,776,049 A | * | 7/1998 | Takahashi | 600/111 |
| 6,437,922 B2 | * | 8/2002 | Enomoto et al. | 359/685 |
| 7,317,580 B2 | * | 1/2008 | Kogo et al. | 359/666 |
| 7,411,739 B2 | * | 8/2008 | Obrebski et al. | 359/666 |

FOREIGN PATENT DOCUMENTS

JP 02006223475 A1 * 8/2006

* cited by examiner

*Primary Examiner* — Audrey Y Chang
(74) *Attorney, Agent, or Firm* — Mark G. Lappin

(57) ABSTRACT

A stereoscopic lens system for a stereo endoscope is disclosed, the stereoscopic lens system converting light propagated from an object and received at an objective end of the stereoscopic lens system to left and right optical images at an image plane end of the stereoscopic lens system. The system includes at least one linearly movable left optical element configured to selectably adjust the magnification and field of view of the left image in response to linear movement and at least one linearly movable right optical element configured to selectably adjust the magnification and field of view of the right image in response to linear movement. The at least one linearly movable left optical element and the at least one linearly movable right optical element are selectably movable in fixed relation to each other.

19 Claims, 18 Drawing Sheets

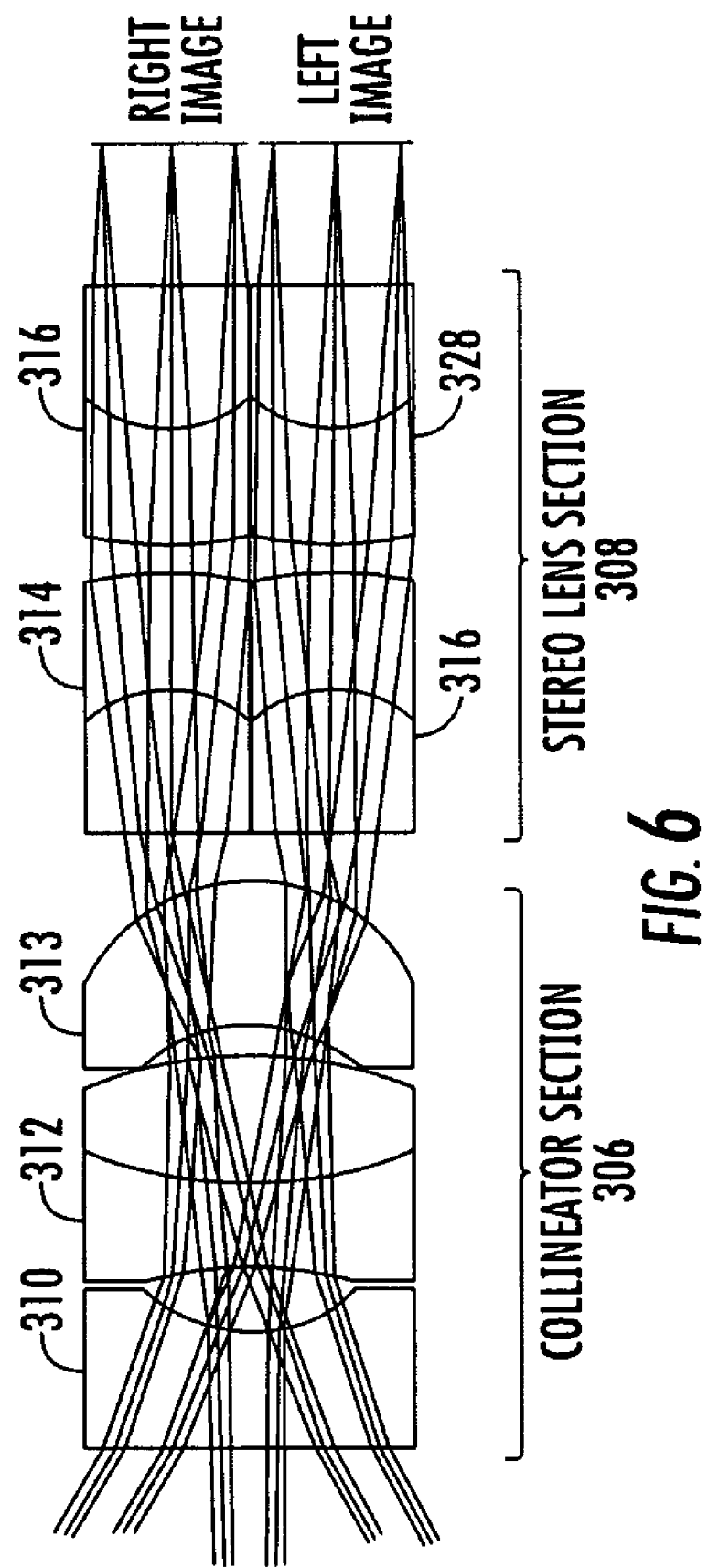

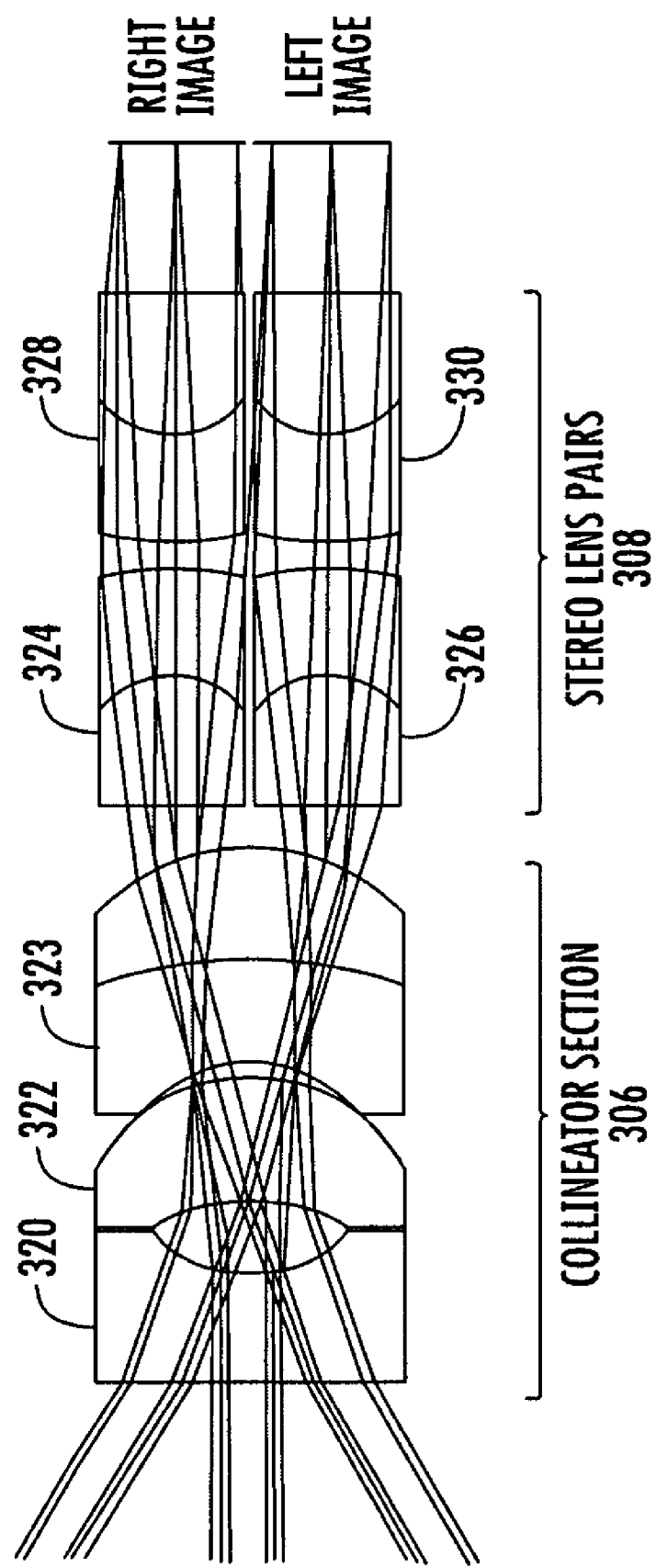

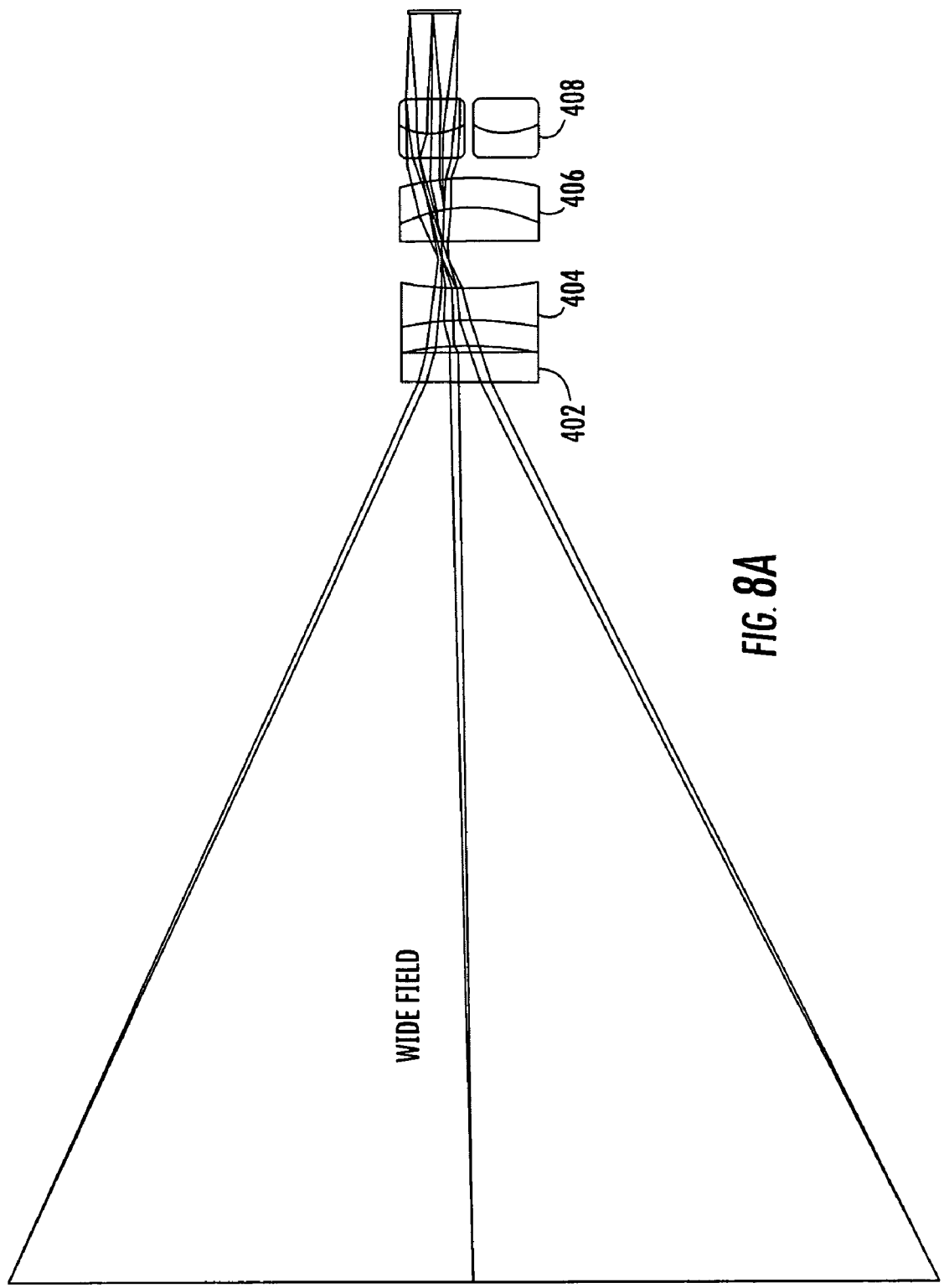

FILE : C:\ZEMAX\3D\3D+ZMa.ZMX
TITLE : STEREO ZOOM
DATE : FRI JAN 12 2007
   LENS NOTES:
    NOTES...
GENERAL LENS DATA:
   SURFACES : 37
   STOP : 7
   SYSTEM APERTURE : FLOAT BY STOP SIZE = 0.1
   GLASS CATALOGS : SCHOTT INFRARED OHARA MISC
   RAY AIMING : REAL REFERENCE, CACHE ON
   X PUPIL SHIFT : 0
   Y PUPIL SHIFT : 0
   Z PUPIL SHIFT : 0
   APODIZATION : UNIFORM, FACTOR = 0.00000E+000
   TEMPERATURE (C) : 2.00000E+001
   PRESSURE (ATM) : 1.00000E+000
   ADJUST INDEX DATA TO ENVIRONMENT : OFF
   EFFECTIVE FOCAL LENGTH : -1.143738 (IN AIR AT SYSTEM TEMPERATURE AND PRESSURE)
   EFFECTIVE FOCAL LENGTH : -1.143738 (IN IMAGE SPACE)
   BACK FOCAL LENGTH : 6.689357
   TOTAL TRACK : 43.57923
   IMAGE SPACE F/# : 8.486094
   PARAXIAL WORKING F/# : 8.516507
   WORKING F/# : 8.552094
   IMAGE SPACE NA : 0.0586086
   OBJECT SPACE NA : 0.002486726
   STOP RADIUS : 0.1
   PARAXIAL IMAGE HEIGHT : 0.4235657
   PARAXIAL MAGNIFICATION : 0.1347779
   ENTRANCE PUPIL DIAMETER : 2.099378
   ENTRANCE PUPIL POSITION : 1.592896
   EXIT PUPIL DIAMETER : 1.958871
   EXIT PUPIL POSITION : -13.5008
   FIELD TYPE : OBJECT HEIGHT IN MILLIMETERS
   MAXIMUM RADIAL FIELD : 10
   PRIMARY WAVELENGTH : 0.5876 μm
   LENS UNITS : MILLIMETERS
   ANGULAR MAGNIFICATION : -0.08461185
FIELDS : 3
FIELD TYPE: OBJECT HEIGHT IN MILLIMETERS

| # | X-VALUE | Y-VALUE | WEIGHT |
|---|---------|---------|--------|
| 1 | 0.000000 | 0.000000 | 1.000000 |
| 2 | 0.000000 | -10.000000 | 1.000000 |
| 3 | 0.000000 | 10.000000 | 1.000000 |

VIGNETTING FACTORS

| # | VDX | VDY | VCX | VCY | VAN |
|---|-----|-----|-----|-----|-----|
| 1 | 0.000000 | 0.000000 | 0.000000 | 0.000000 | 0.000000 |
| 2 | 0.000000 | 0.000000 | 0.000000 | 0.000000 | 0.000000 |
| 3 | 0.000000 | 0.000000 | 0.000000 | 0.000000 | 0.000000 |

FROM FIG. 10A

WAVELENGTHS : 3
UNITS: μm

| # | VALUE | WEIGHT |
|---|-------|--------|
| 1 | 0.486100 | 1.000000 |
| 2 | 0.587600 | 1.000000 |
| 3 | 0.656270 | 1.000000 |

SURFACE DATA SUMMARY

| SURF | TYPE | RADIUS | THICKNESS | GLASS | DIAMETER | CONIC |
|------|------|--------|-----------|-------|----------|-------|
| OBJ | STANDARD | INFINITY | 25 | | 20 | 0 |
| 1 | STANDARD | INFINITY | 0.8 | SILICA | 3 | 0 |
| 2 | STANDARD | INFINITY | 0.21 | | 3 | 0 |
| 3 | STANDARD | -3.864 | 0.8 | SFL6 | 2.5 | 0 |
| 4 | STANDARD | -3.965 | 0.8 | LAK8 | 3 | 0 |
| 5 | STANDARD | 6.82 | 1 | | 3 | 0 |
| 6 | COORDBRK | - | 0 | | - | - |
| STO | STANDARD | INFINITY | 0.3 | | 0.2 | 0 |
| 8 | COORDBRK | - | 0 | | - | - |
| 9 | STANDARD | 50.1 | 1 | LAK8 | 3 | 0 |
| 10 | STANDARD | -2.687 | 0.8 | SFL6 | 3 | 0 |
| 11 | STANDARD | -4.216 | 0.4 | | 3 | 0 |
| 12 | COORDBRK | - | 0 | | - | - |
| 13 | STANDARD | INFINITY | 0.16 | | 0 | 0 |
| 14 | STANDARD | 3.248 | 0.7 | SFL6 | 1.5 | 0 |
| 15 | STANDARD | 1.112 | 1 | LAK8 | 1.5 | 0 |
| 16 | STANDARD | -3.200443 | 2.266537 | | 1.5 | 0 |
| 17 | STANDARD | INFINITY | 7.5 | | 1.000848 | 0 |

FIG. 10B

GENERAL LENS DATA:

| | |
|---|---|
| SURFACES | : 47 |
| STOP | : 24 |
| SYSTEM APERTURE | : ENTRANCE PUPIL DIAMETER-0.16 |
| GLASS CATALOGS | : SCHOTT MISC OHARA |
| RAY AIMING | : PARAXIAL REFERENCE, CACHE ON |
| X PUPIL SHIFT | : 0 |
| Y PUPIL SHIFT | : 0 |
| Z PUPIL SHIFT | : 0 |
| APODIZATION | : UNIFORM, FACTOR = 0.00000E+000 |
| TEMPERATURE (C) | : 2.00000E+001 |
| PRESSURE (ATM) | : 1.00000E+000 |
| ADJUST INDEX DATA TO ENVIRONMENT | : OFF |
| EFFECTIVE FOCAL LENGTH | : 1.29876 (IN AIR AT SYSTEM TEMPERATURE AND PRESSURE) |
| EFFECTIVE FOCAL LENGTH | : 1.29879 (IN IMAGE SPACE) |
| BACK FOCAL LENGTH | : 8.730514 |
| TOTAL TRACK | : 98.1963 |
| IMAGE SPACE F/# | : 8.117252 |
| PARAXIAL WORKING F/# | : 8.167218 |
| WORKING F/# | : 8.097481 |
| IMAGE SPACE NA | : 0.36113595 |
| OBJECT SPACE NA | : 0.004613707 |
| STOP RADIUS | : -0.5571739 |
| PARAXIAL IMAGE HEIGHT | : 0.8289941 |
| PARAXIAL MAGNIFICATION | : -0.0753631 |
| ENTRANCE PUPIL DIAMETER | : 0.16 |
| ENTRANCE PUPIL POSITION | : 2.339453 |
| EXIT PUPIL DIAMETER | : 1.958871 |
| EXIT PUPIL POSITION | : -15.81227 |
| FIELD TYPE | : OBJECT HEIGHT IN MILLIMETERS |
| MAXIMUM RADIAL FIELD | : 11 |
| PRIMARY WAVELENGTH | : 0.5875618 μm |
| LENS UNITS | : MILLIMETERS |
| ANGULAR MAGNIFICATION | : 0.08167969 |

FIELDS : 3
FIELD TYPE: OBJECT HEIGHT IN MILLIMETERS

| # | X-VALUE | Y-VALUE | WEIGHT |
|---|---|---|---|
| 1 | 0.000000 | 0.000000 | 1.000000 |
| 2 | 0.000000 | 11.000000 | 1.000000 |
| 3 | 0.000000 | -11.000000 | 1.000000 |

VIGNETTING FACTORS

| # | VDX | VDY | VCX | VCY | VAN |
|---|---|---|---|---|---|
| 1 | 0.000000 | 0.000000 | 0.000000 | 0.000000 | 0.000000 |
| 2 | 0.000000 | 0.000000 | 0.000000 | 0.160000 | 0.000000 |
| 3 | 0.000000 | 0.000000 | 0.000000 | 0.000000 | 0.000000 |

WAVELENGTHS : 3
UNITS: μm

| # | VALUE | WEIGHT |
|---|---|---|
| 1 | 0.486133 | 1.000000 |
| 2 | 0.587562 | 1.000000 |
| 3 | 0.656273 | 1.000000 |

*FIG. 14*

STEREOSCOPIC ZOOM ENDOSCOPE

BACKGROUND

The present disclosure relates generally to optical lens systems, and, more particularly, relates to stereoscopic objective lens designs with a zoom function adapted for use in stereo video endoscopes.

Medical endoscopes are widely utilized to view internal regions of the human body during diagnostic, surgical, and other medical procedures. Endoscopes typically include a long, thin, rigid or semi-rigid optical cylinder affixed to a viewing mechanism. The cylinder is sufficiently narrow to be inserted through a small opening in the body, which may be natural or surgical. When the endoscope is inserted and positioned for use, an image of the object being viewed is formed at an inserted end of the endoscope by an objective lens. The image passes through a series of relay lenses down the cylinder to an eye lens or video camera at a viewing end of the endoscope.

In recent years, researchers have attempted to improve the imaging available through endoscopic devices by developing stereoscopic video endoscopes. These endoscopes present an apparently three-dimensional image on a video monitor. The stereoscopic effect is created by producing two optical images—a left image and a right image—through the endoscope. The left and right optical images are presented by the endoscope to left and right image sensors, which may be charge-coupled device (CCD) cameras or other image sensing devices. The sensing devices convert the left and right optical images into left and right video images which are then presented as alternating left-right images on a monitor, at a switching rate higher than the flicker-sensing limit of the human eye, so that observed images appear flicker-free.

In existing stereoscopic video endoscopes, the object position, which corresponds to the distance from the end of the endoscope to the area of interest, is fixed at the location corresponding to the stereo plane designed into the endoscope. Any departure from this plane causes differential results in the stereoscopic effect. Nevertheless, surgeons commonly change the distance to the object of interest when using a stereoscopic video endoscope. For example, to see more area, the surgeon may pull the endoscope away from the object of interest, and conversely to increase the magnification, the surgeon may move the endoscope closer to the object of interest. It would be desirable to have a stereoscopic video endoscope that provides the ability to change the magnification without moving the endoscope.

SUMMARY

The inventors have realized that by including an objective lens system with a linear zoom mechanism in a stereo endoscope, the user is provided with the ability to change the magnification and/or field of view without moving the endoscope, and thus without degrading the 3D effect. The inventors have also realized that further including an angle reduction telescope in the endoscope provides the user with an angled line of sight. The angle reduction telescope may be incorporated in a rotatable end of the endoscope, thereby allowing the user to view additional areas of interest without changing the position of the endoscope.

In one aspect, a stereoscopic lens system for a stereo endoscope is disclosed, the stereoscopic lens system converting light propagated from an object and received at an objective end of the stereoscopic lens system to left and right optical images at an image plane end of the stereoscopic lens system. The system includes at least one linearly movable left optical element configured to selectably adjust the magnification and field of view of the left image in response to linear movement and at least one linearly movable right optical element configured to selectably adjust the magnification and field of view of the right image in response to linear movement. The at least one linearly movable left optical element and the at least one linearly movable right optical element are selectably movable in fixed relation to each other.

In some embodiments, the system includes one or more optical elements adapted to collect light from an object and direct first and second portions of the light along a left optical path and a right optical path respectively; a left group of optical elements having an optical axis disposed along the left optical path and configured to provide a selectably magnified left image of the object at the image plane; and a right group of optical elements having an optical axis disposed along the right optical path and configured to provide a selectably magnified left image of the object at the image plane. The left and right groups of optical elements each include at least one fixed zoom lens, at least one object side movable zoom lens proximate the object end, and linearly movable along the optical axis, at least one image side movable zoom lens proximate the image plane, and linearly movable along the optical axis, the at least one object side movable zoom lens and the at least one image side movable zoom lens being selectably movable in fixed relation to each other. The magnification and field of view of the left image and the magnification and field of view of the right image depend on the position of the movable zoom lenses of said left group of optical elements and right group of optical elements, respectively.

In some embodiments, the at least one object side movable zoom lens and the at least one image side movable zoom lens of the left group of optical elements are movable in fixed relationship to the at least one object side movable zoom lens and the at least one image side movable zoom lens of the right group of optical elements.

In some embodiments, the at least one object side movable zoom lens and the at least one image side movable zoom lens of the left group of optical elements and the at least one object side movable zoom lens and at least one image side movable zoom lens of the right group of optical elements are affixed to a selectably movable platform.

In some embodiments, for each of the left group of optical elements and the right group of optical elements, the at least one fixed zoom lens includes a positive lens, the at least one object side lens includes a negative lens, and the at least one image side lens includes a negative lens.

In some embodiments, corresponding portions of the left and right images are mapped to within a selected distance of each other at the image plane.

In some embodiments, the one or more optical elements adapted to collect light from an object and direct first and second portions of the light along a left optical path and a right optical path includes at least one collimator lens proximate the objective end for collecting and substantially collimating light from points on the object, at least one right stereo lens and at least one left stereo lens adjacent to the collimator lens for collecting light from the collimator lens. The optical axis of the right and left stereo lenses are substantially parallel to the optical axis of the collimator lens. The collimator lens and the right and left stereo lenses are arranged so that the collimator lens provides equal-angle light ray pairs from symmetrically disposed object points to the right and left stereo lenses.

In some embodiments, the system also includes a cover glass adjacent the at least one collimator lens and proximate the objective end. In some embodiments, the cover glass includes fused silica. The cover glass may be scratch resistant.

In some embodiments, the system also includes at least one left relay lens positioned along the left optical path; and at least one right relay lens positioned along the right optical path.

In some embodiments, the at least one right relay optical lens is positioned between the at least one right stereo lens and the right group of optical elements, and the at least one left relay optical lens is positioned between the at least one left stereo lens and the left group of optical elements.

In some embodiments, the at least one right relay optical lens is configured to relay a pupil from a position adjacent to the at least one right stereo lens into the right group of optical elements, and the at least one left relay optical lens is configured to relay a pupil from a position adjacent to the at least one left stereo lens into the left group of optical elements.

In some embodiments the system also includes at least one right imaging lens configured to receive light from the right group of optical elements and to provide the right image at the image plane, and at least one left imaging lens configured to receive light from the left group of optical elements and to provide the left image at the image plane.

In some embodiments, the left group of optical elements and the right group of optical elements each comprise first and second linearly movable zoom lenses positioned on opposing sides of a fixed zoom lens and movable in fixed relation to each other.

In some embodiments the system also includes a reduction telescope configured to provide an angled line of sight. For example, in some embodiments the system also includes a pupil-imaging lens aligned along the optical axis of the least one collimator lens and positioned closer to the objective end than the at least one collimator lens, and an angle reduction telescope aligned along the optical axis with the at least one collimator lens and positioned closer to the objective end than the pupil-imaging lens, the angle reduction telescope configured to provide an angled line of sight. In some embodiments, the angle reduction telescope is configured to be rotatable in a rotation plane positioned between the angle reduction telescope and the pupil-imaging lens.

In some embodiments, the at least one linearly movable left optical element and the at least one linearly movable right optical are configured to provide at least three times magnification of the object at the left image and the right image respectively.

In some embodiments, the lens system is configured to provide the left and right optical images with substantially diffraction limited resolution across the field of view of the endoscope.

A number of documents are incorporated herein by reference. In case of conflict, the current specification will control. The details of one or more embodiments are set forth in the accompanying drawings and the description below. Other features and advantages will be apparent from the description and drawings, and from the claims.

BRIEF DESCRIPTION OF THE DRAWINGS

FIGS. 6 and 7 are optical schematic diagrams depicting an objective lens system wherein the collimating lens system is formed of a combination of singlet and doublet lenses.

FIGS. 8A and 8B show an optical schematic diagram depicting an objective lens system with a zoom set for a wide field of view, showing light rays transmitted through the system.

FIGS. 10A and 10B are a summary of optical data related to the working example of Table D.

FIG. 14 is a summary of optical data related to the working example of Table E.

DETAILED DESCRIPTION OF PREFERRED EMBODIMENTS

Figure 1:
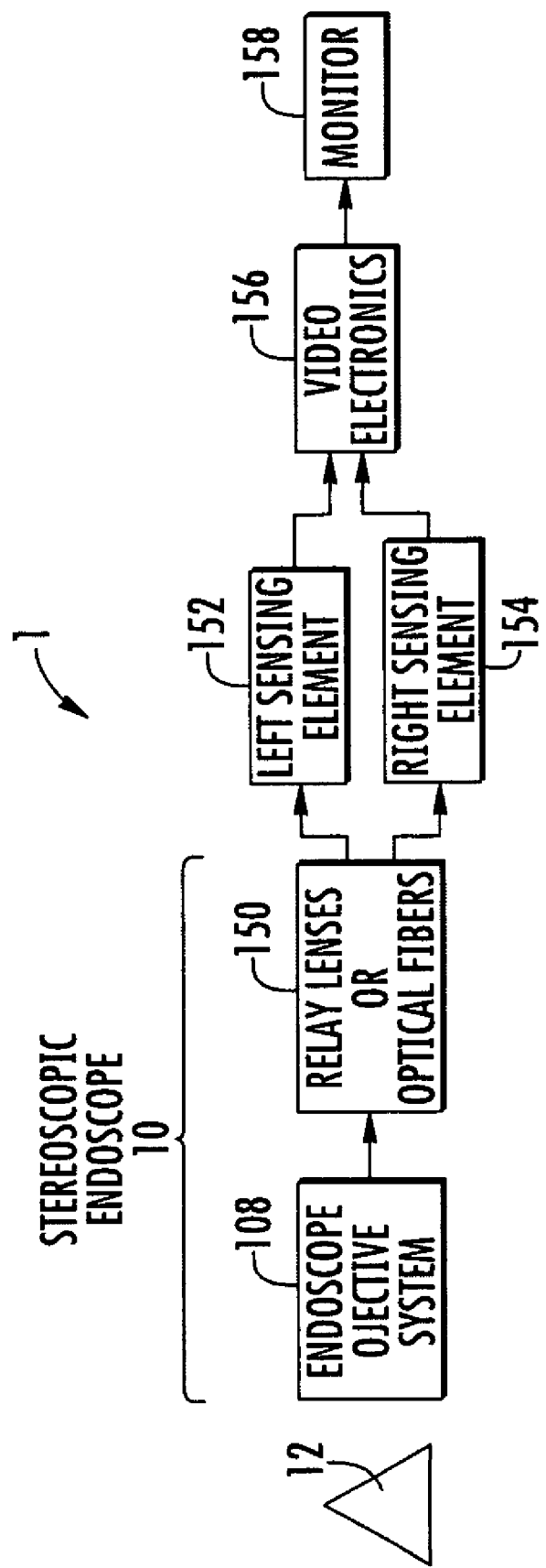
FIG. 1 is a schematic diagram depicting a stereo video endoscope utilizing an objective lens system.

FIG. 1 depicts an endoscope objective system 100, utilized in a stereo video endoscopy system 1 for generating stereoscopic images of an object 12. The system 1 includes a stereoscopic endoscope 10 containing objective system 100, sensing modules 152, 154, switching module 156, and a monitor 158. In addition to objective lens system 100, the endoscope 10 includes conventional relay lenses or optical fibers 150 for transmitting light collected by the endoscope objective system 100 to light sensing modules 152, 154.

The endoscope objective system 100 generates left and right optical images of the object 12 that are processed by sensing elements 152, 154 and video switching module 156 in a known manner to display an apparently three-dimensional image of the object 12 on video monitor 158.

The stereoscopic effect is created by producing two optical images—a left image and a right image—through the endoscope objective system 100. The left and right optical images generated by the objective system 100 are presented by the relay lens or optical fiber system 150 to left and right image sensors 152, 154, which can be conventional charge-coupled device (CCD) cameras or other image sensing devices. The CCD elements operate in a known manner to convert the light collected by the objective system 100, and transmitted by the relay lenses or optical fibers 150, into electrical signals representative of the left and right optical images of the object 12.

Conventional video switching circuitry 156 transmits the electronic signals representative of left and right video images as alternating left-right images on the monitor 158. In accord with known video practice, these alternating images are presented at a switching rate higher than the flicker-sensing limit of the human eye, so that observed images appear flicker-free.

Moreover, the images can be alternately switched from a left-hand polarization mode to a right-hand polarization mode, such that, for example, the left image has a left-hand polarization and the right image has a right-hand polarization. The observer wears polarized glasses in which the left lens has the left-hand polarization and the right lens has the right-hand polarization. Thus, when the observer views the monitor 158, the left eye sees only images from the left channel of the endoscope system and the right eye sees only images from the right channel, resulting in stereoscopic viewing. Video switching and display equipment of this commercially available from Stereographic, Inc. of San Rafael, Calif.; and from Tektronix Corp, of Beaverton, Oreg.

Figure 2:
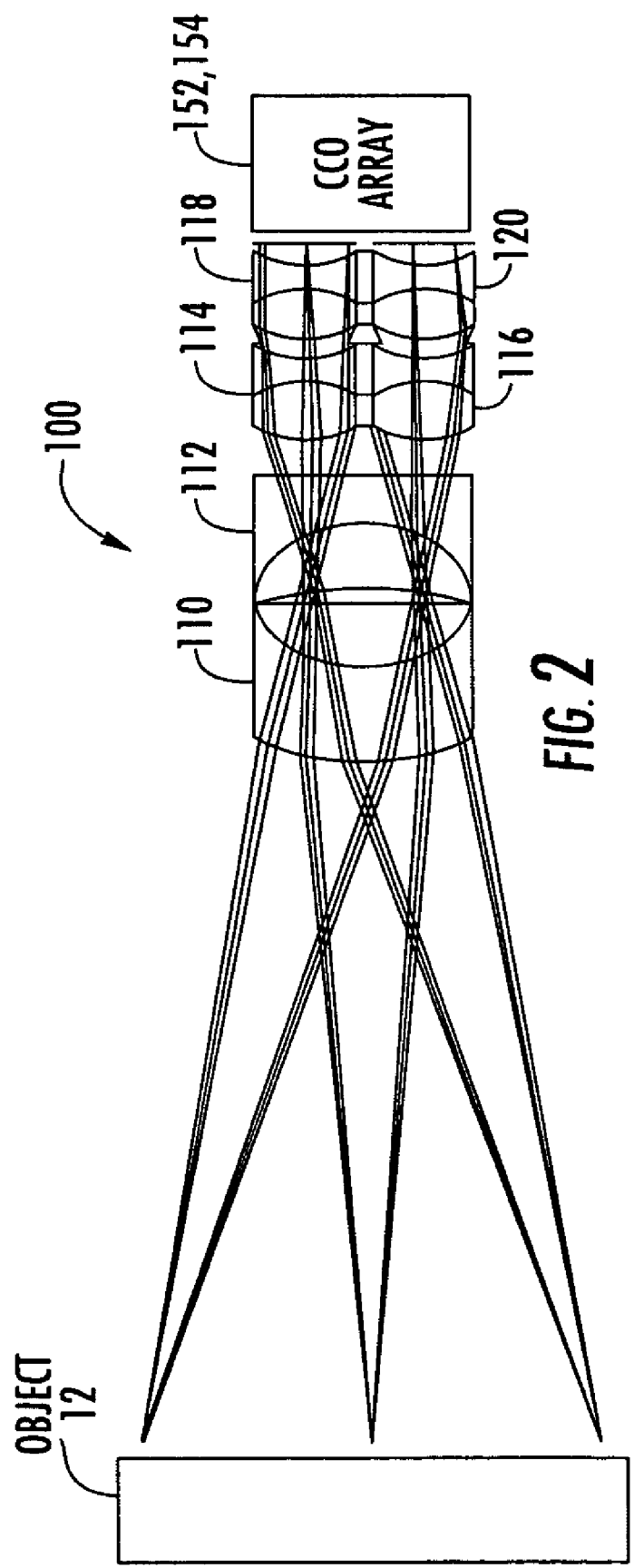
FIG. 2 is an optical schematic diagram depicting an objective lens system, showing light rays transmitted through the system.
Figure 3:
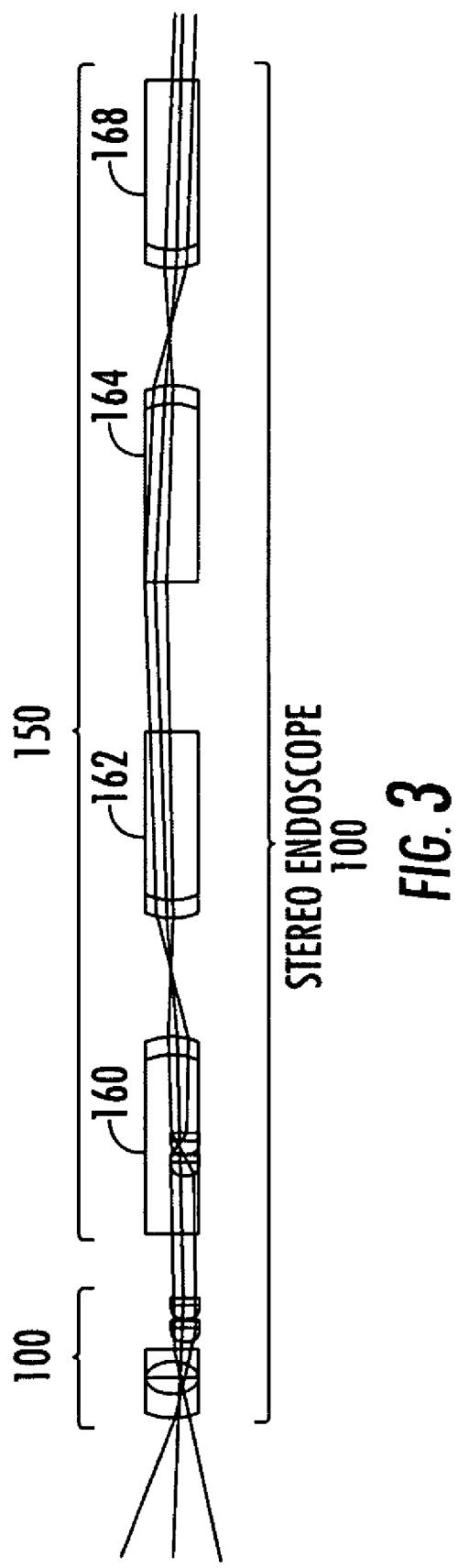
FIG. 3 is an optical schematic diagram depicting the objective lens system of FIG. 2 in combination with relay lenses for transmitting the optical images.

The accuracy and quality of the image displayed on monitor 158 is controlled by the performance of the endoscope objective system 100. FIGS. 2 and 3 depict an objective lens system 100, showing light rays transmitted through the system. FIGS. 2 and 3 depict the same system, with two elements being omitted from FIG. 3 for purposes of clarity.

As indicated in FIG. 2, one embodiment of the objective system 100 includes two full-diameter doublets 110, 112 and a double set of two half-diameter identical doublets 114, 116, 118, 120. The full-diameter doublets collimate object points, i.e., image them to infinity. Most of the optical power required to accomplish this collimation is provided by the first collimator doublet 110 closest to the object 12, while the second collimator doublet 112 can have a very low optical power.

Those skilled in the art will appreciate that the lenses of the objective system 100 depicted in FIG. 2 define a sequence of sixteen optical surfaces. A working example of a set of lenses objective system 100 is set forth below in Table A.

TABLE A

| SURFACE | RADIUS | THICKNESS | APERTURE | GLASS |
|---|---|---|---|---|
| 1 | — | 4.002608 | 0.225000 | AIR |
| 2 | 6.211875 | 2.500000 | 3.000000 | SK5 |
| 3 | 4.462623 | 1.500000 | 3.000000 | SF8 |
| 4 | 53.596342 | 0.400000 | 3.000000 | AIR |
| 5 | −11.075366 | 1.600000 | 2.500000 | SK5 |
| 6 | −3.318618 | 1.500000 | 3.000000 | SF8 |
| 7 | −31.896589 | −1.200000 | 2.500000 | AIR |
| 8 | — | 1.900000 | 0.464074 | AIR |
| 9 | 2.747539 | 1.600000 | 1.500000 | SSKN8 |
| 10 | −3.153676 | 0.700000 | 1.500000 | SF1 |
| 11 | 4.815753 | 0.250000 | 1.500000 | AIR |
| 12 | 2.747539 | 1.600000 | 1.500000 | SF1 |
| 13 | −3.153676 | 0.700000 | 1.500000 | SSKN8 |
| 14 | 4.815753 | 0.400000 | 1.500000 | AIR |
| 15 | — | 0.001000 | 1.400000 | BK7 |
| 16 | — | — | 1.400000 | AIR |

In Table A, the numerical value in the "RADIUS" and "THICKNESS" columns are set forth in millimeters. The "GLASS" descriptions are standard optical glass characterizations as found in the product catalog of the Schott Glass Company of the Federal Republic of Germany. The "THICKNESS" column refers to the distance to the next optical surface. For example, in connection with surface 3, the number 1.5000 signifies 1.5 millimeters to surface 4. The column "RADIUS" refers to the radii of curvature of the respective curved surfaces. In this working example, the lens diameters are 6 millimeters for the large doublets and 3 millimeters for the small doublets. The overall object-to-image distance is 28.3 millimeters. The image diameter is 2.5 millimeters.

Figure 4:
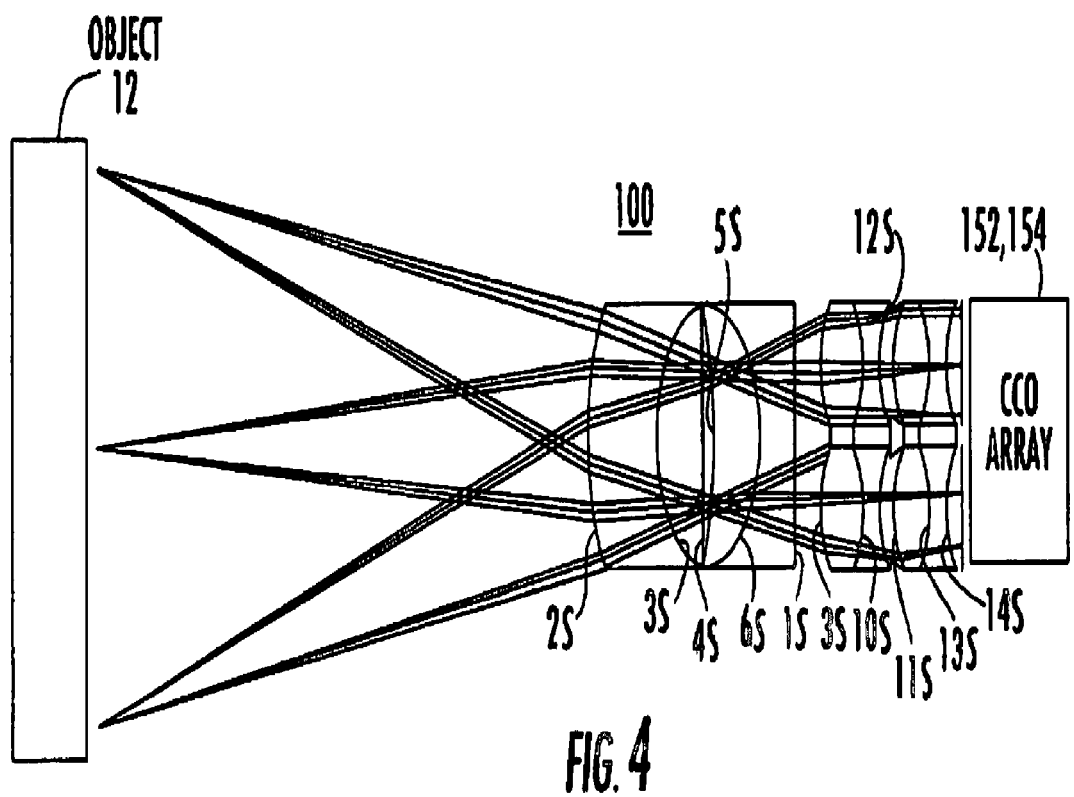
FIG. 4 is an optical schematic diagram of the objective lens system of FIG. 2 illustrating the location of the surfaces specified in Table A.

In Table A, the surfaces correspond to the labeled surfaces in FIG. 4. The surfaces in the table identified as 1, 8, 15 and 16 do not correspond to actual surfaces, but are artifacts introduced by the specific program employed to generate this table. For clarity the numbered surfaces from table A are designated with an S following the numeral, for example, the surface designated 2S in FIG. 4 corresponds to the surface 2 in table A.

The system 100 is designed so that all parts of each left/right image are mapped to within a selected distance of each other such that stereoscopic image quality is maintained. For video applications, this selected distance is typically a fraction of a video pixel. This is a difficult condition to satisfy, because the object-to-image ray paths through the lens system are quite different for the left and right image points of a common object point. FIG. 2 clearly illustrates this path difference. The ray paths shown in FIG. 2 demonstrate how differently an object point is imaged through the lens elements for the left and right images.

The objective system 100 depicted in FIG. 2 is able to map all parts of each left/right image to within a fraction of a video pixel to each other, because the large collimator doublets present equal-angle pairs from symmetrically disposed object points to the small stereo doublet pairs.

This exact equal-angle solution results in an accurate object/image mapping onto the final stereo image pair. Accuracy is also enhanced by the combination of a first high power collimator doublet 110 and a second, lower power collimator doublet 112. This second doublet 112 strongly influences the optical solution to the image-mapping problem.

A further advantage is provided in that the smaller doublets 114, 116, 118, and 120 are identical, so that they can be most economically fabricated in production quantities. This characteristic tends to offset the inherent difficulty of manufacturing small lenses. The larger, and hence easier to fabricate, doublets carry the corrective burden, so that the smaller, more difficult to manufacture lenses can be as simple as possible.

Figure 5:
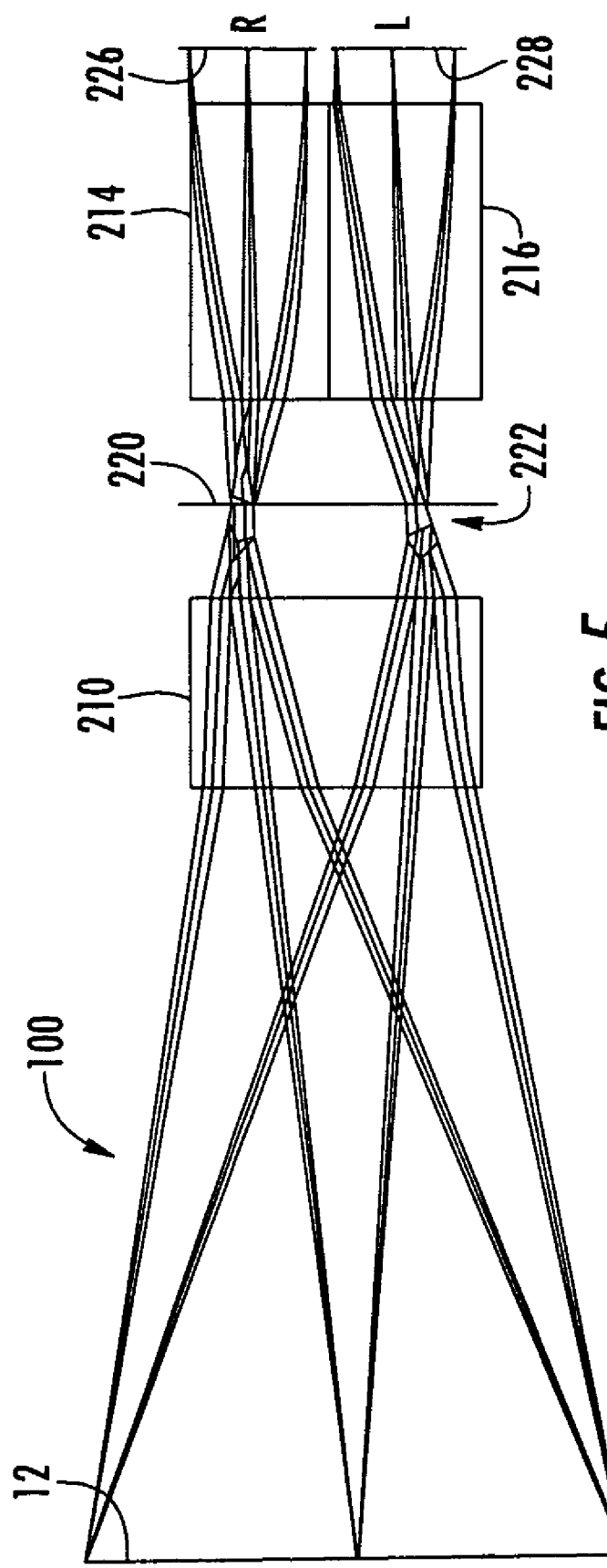
FIG. 5 is an optical diagram of the objective lens system of FIG. 2 incorporating gradient index lenses in place of the doublet lenses.

FIG. 5 illustrates an objective system 100 where the lens systems are formed of gradient index lenses (GRINS) in place of the doublet lenses. These lenses can be manufactured to duplicate the optical performance of the doublet lenses. In FIG. 5 a full diameter GRIN collimator lens 210 performs the collimator function and a matched pair of GRIN one half diameter stereo lenses 214 an 216 complete the objective lens assembly. The pair of stereo lenses produces left and right images 226 and 228 on the image plane. (A pair of aperture stops 220 and 222 may be employed to define the pupils.)

Of course aperture stops may be placed at other locations in the objective lens system according to the purposes of the designer.

FIGS. 6 and 7 illustrate objective lens systems in which the collimator lens system is formed of a combination of singlet and doublet lenses. The embodiment of the objective system 100 illustrated in FIG. 6 includes in the collimator lens system 306 a singlet lens 310 coupled to a doublet lens 312, coupled to another singlet lens 313. The stereo lens pair system 308 is formed as in FIG. 2 by a pair of doublet lenses 314 ad 316 coupled to a second pair of doublet lenses 316 and 320. The full diameter lens system collimates object points. The critical requirement is that the collimator system present equal angle pairs from symmetrically disposed object points to the small stereo lens pairs. This can be accomplished with a doublet lens system as illustrated in FIG. 2, a GRIN lens system as illustrated in FIG. 5, combinations of singlets and doublets as illustrated in FIG. 6 or 7, triplet lenses or combinations of the above. Of course, the stereo lens system can be formed of GRIN lenses also, as well as combinations of singlets, doublets, and triplets as above.

A working example of a set of lenses for implementation of the objective lens system 100 illustrated in FIG. 6 is set forth in Table B. As in Table A, the numerical value in the radius and thickness columns are in millimeters. The "GLASS" descriptions are standard optical glass characterizations as found in the product catalog of the Schott Glass Company of the Federal Republic of Germany. The "THICKNESS" column refers to the distance to the next optical surface. For example, in connection with surface 3, the number 1.5000 signifies 1.5 millimeters to surface 4. The column "RADIUS" refers to the radii of curvature of the respective curved surfaces.

In Table B lens surfaces 1, 2, 9, 16 and 17 do not correspond to actual lens surfaces.

TABLE B

STEREO OBJECTIVE, TYPE 3

| SUR-FACE | RADIUS | THICKNESS | APERTURE | GLASS | SPE |
|---|---|---|---|---|---|
| 1 | — | −3.222728 | 0.180000A | AIR | |
| 2 | — | 2.000000 | 3.000000 | SIO2 | C |
| 3 | 3.000000 | 1.130000 | 2.000000 | AIR | |
| 4 | −6.917339 | 1.500000 | 2.000000 | SF1 | |
| 5 | 9.000000 | 2.200000 | 3.000000 | LAKN12 | |
| 6 | −8.000000 | 0.505000 | 3.000000 | AIR | |
| 7 | −3.200000 | 2.500000 | 2.100000 | F4 | |
| 8 | −3.422239 | −1.400000 | 3.000000 | AIR | |
| 9 | — | 2.200000 | 1.000000 | AIR | |
| 10 | 44.701000 | 2.500000 | 1.500000 | LAK8 | |
| 11 | −2.100000 | 2.000000 | 1.500000 | SF1 | |
| 12 | −8.920000 | 0.500000 | 1.500000 | AIR | |
| 13 | 8.920000 | 2.000000 | 1.500000 | SF1 | |
| 14 | 2.100000 | 2.500000 | 1.500000 | LAK8 | |
| 15 | −44.701000 | 2.395144 | 1.500000 | AIR | |
| 16 | — | 0.001000 | 1.250000 | BK7 | |
| 17 | — | — | 1.250000 | AIR | |

FIG. 7 illustrates another collimator lens combination 306, employing a sequence of let lenses 320 and 322 followed by doublet lenses 323. The physical characteristics sequence are set forth in Table C (the units of numerical values and meaning of the headings are the same as in the tables above).

Table C is a working example of the objective lens system illustrated in FIG. 7.

In Table C lens surfaces 1, 2, 9, 16 and 17 do not correspond to physical lens surfaces.

TABLE C

STEREO VIDEO SYSTEM

| SUR-FACE | RADIUS | THICKNESS | APERTURE | GLASS | SPE |
|---|---|---|---|---|---|
| 1 | — | −3.095070 | 0.160000A | AIR | |
| 2 | — | 2.000000 | 3.000000 | SIO2 | C |
| 3 | 3.000000 | 1.245000 | 2.000000 | AIR | |
| 4 | −4.400000 | 2.200000 | 2.000000 | F4 | |
| 5 | −3.522702 | 0.244000 | 3.000000 | AIR | |
| 6 | −2.856443 | 2.000000 | 2.100000 | LAKN12 | |
| 7 | −9.000000 | 2.000000 | 3.000000 | SF1 | |
| 8 | −4.387343 | −1.400000 | 3.000000 | AIR | |
| 9 | — | 2.200000 | 1.000000 | AIR | |
| 10 | 44.701000 | 2.500000 | 1.500000 | LAK8 | |
| 11 | −2.100000 | 2.000000 | 1.500000 | SF1 | |
| 12 | −8.920000 | 0.500000 | 1.500000 | AIR | |
| 13 | 8.920000 | 2.000000 | 1.500000 | SF1 | |
| 14 | 2.100000 | 2.500000 | 1.500000 | LAK8 | |
| 15 | −44.701000 | 2.669074 | 1.500000 | AIR | |

TABLE C-continued

STEREO VIDEO SYSTEM

| SUR-FACE | RADIUS | THICKNESS | APERTURE | GLASS | SPE |
|---|---|---|---|---|---|
| 16 | — | 0.001000 | 1.250000 | BK7 | |
| 17 | — | — | 1.250000 | AIR | |

As indicated in FIG. 1, the endoscope objective system 100 can be utilized in connection with optical fiber elements or a set of relay lenses 150 to conduct light from the objective system to the sensing element 152, 154. An example of the relay lens system 150 that can be employed with the objective system 100 is depicted in FIG. 3.

The relay lens system of FIG. 3 includes a plurality of rod relays 160, 162, 164 utilized in combination with objective system 100. Those skilled in the art will recognize that a wide range of relay lens systems can be employed with an objective system of the type described herein.

Alternatively, an endoscope of the type described herein can employ a conventional CCD array mounted within the same housing as the objective system. As indicated in FIG. 2, the CCD array can include left and right sensing elements 152, 154, disposed to receive the optical images generated at the output of doublets 118 and 120. The design and construction of CCD elements having more than one photosensitive region in a monolithic package is well known in the art. The electrical signals generated by the CCD array can be conducted from the housing by a conventional conduit. This configuration eliminates the requirement for a relay lens system or optical fibers.

The system 100 depicted in FIGS. 2 and 3 offers advantages for use in medical endoscopes and industrial borescopes. The configuration offers the advantage of being adaptable to fit into a small tube diameter, as small as 3 millimeters. The design also affords high resolution and low distortion for diagnostic and surgical use, and for high-accuracy industrial measurement applications.

The systems as described above can be modified to provide additional capabilities including the ability to provide zoom and rotation. By providing a zoom capability, an operator of the system can alter a field of view between a narrow field of view and a wide field of view without adjusting the position of the system. By providing a rotational capability, an operator of the system can change the line of sight and thus effectively view different areas of an object without adjusting the position of the system. In is to be understood that systems incorporating these additional capabilities may also include any of the various features presented in relation to the systems described above.

Figure 8B:
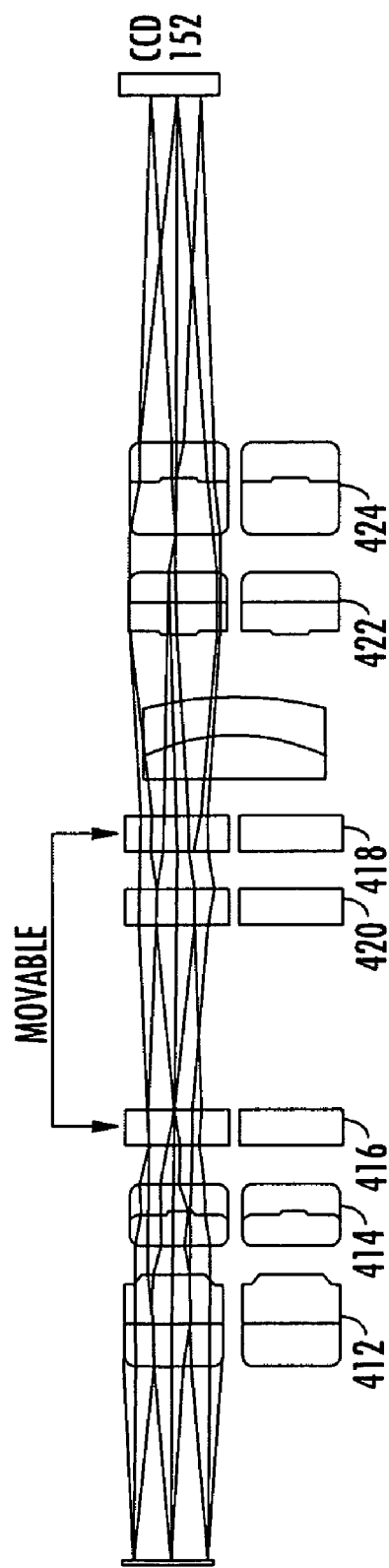

FIGS. 8A and 8B show an optical schematic diagram depicting an objective lens system with a zoom set for a wide field of view, showing light rays transmitted through the system. FIG. 8A shows the part of the objective lens system closer to the objective end, and FIG. 8B shows the part of the objective lens system closer to the image end. As shown in FIG. 8A, the system includes a cover glass 402, full diameter objective lenses 404 and 406, and half-diameter stereo lens pair 408. The cover glass 402 is preferably formed of a fused silica or other material capable of forming a hard surface to resist scratching and damage to the system, but is not necessary for the system. The full diameter objective lenses 404 and 406 can be implemented in the same manner as the lenses described above for collimating the object points. Although shown as doublets in a manner similar to those in FIG. 2, the full diameter objective lenses 404 and 406 can also be implemented as singlet lenses, some combination of singlet and doublet lenses, or gradient index lenses.

The half-diameter stereo lens pair 408 produces left and right images from the light collimated by the full diameter objective lenses 404 and 406. The half-diameter stereo lens pair 408 can be implemented in the same manner as the lenses described above for producing left and right images from the collimated object points. Although shown as doublets in a manner similar to those in FIG. 2, the half-diameter objective lens pair 408 can also be singlet lenses, some combination of singlet and doublet lenses, or gradient index lenses.

As shown in FIG. 8B, the objective lens system also includes relay lenses 412 and 414, movable zoom lenses 416 and 418, fixed zoom lens 420, and final imaging lenses 422 and 424. All of these lenses are half-diameter lenses like the half-diameter objective lens pair 408 and are aligned along an optical axis with the half-diameter objective lens pair 408. The relay lenses 412 and 414 may be identical pairs of right and left lenses and are configured to form a unit magnification telescope to relay a pupil from a position between the half-diameter objective lens pair and the relay lenses 412 into the movable zoom lens 416.

The movable zoom lenses 416 and 418 are preferably implemented as right and left pairs of negative lenses (i.e., causing incident light to diverge) and are configured to be movable in a straight line in fixed relation to each other along the optical axis. The mechanism for moving the movable zoom lenses 416 and 418 can be any mechanical and/or electronic device capable of moving the movable zoom lenses 416 and 418 in a straight line. The moving mechanism can be relatively simple and need not include any cam arrangement. For example, the moving mechanism can be implemented as a single simple platform upon which the movable zoom lenses 416 and 418 are mounted. The movable zoom lenses 416 and 418 may be actuated to provide the zoom effect using any suitable system. For example, in some embodiments, the movable lenses may be actuated using a hand-actuated, spring loaded push-pull wire guide system (not shown). In some embodiments, the movable lenses my be actuated by a driving motor controlled by a switch (not shown). In various embodiments, the switch could be, for example, a hand, foot, or even voice controlled device operated by the user of the zoom endoscope, or an assistant.

The fixed zoom lens 420 is preferably implemented as a right and left pair of positive lenses (i.e., causing incident light to converge to a focal point). The fixed zoom lens 420 is positioned in between the movable zoom lenses 416 and 418.

The final imaging lenses 422 and 424 are preferable implemented as right and left pairs of lenses for producing right and left images on an image plane. The CCD 152 (and CCD 154, not shown in FIG. 8B) can detect the right and left images at the image plane and convert the collected light into electrical signals representative of the left and right optical images of the object.

In the position shown in FIG. 8B, the movable zoom lens 416 is adjacent to the relay lens 414, and the movable zoom lens 418 is adjacent to the fixed zoom lens 420. In this position, the movable zoom lenses 416 and 418 and the fixed zoom lens 420 provide a wide field of view as shown in FIG. 8A.

Figure 9A:
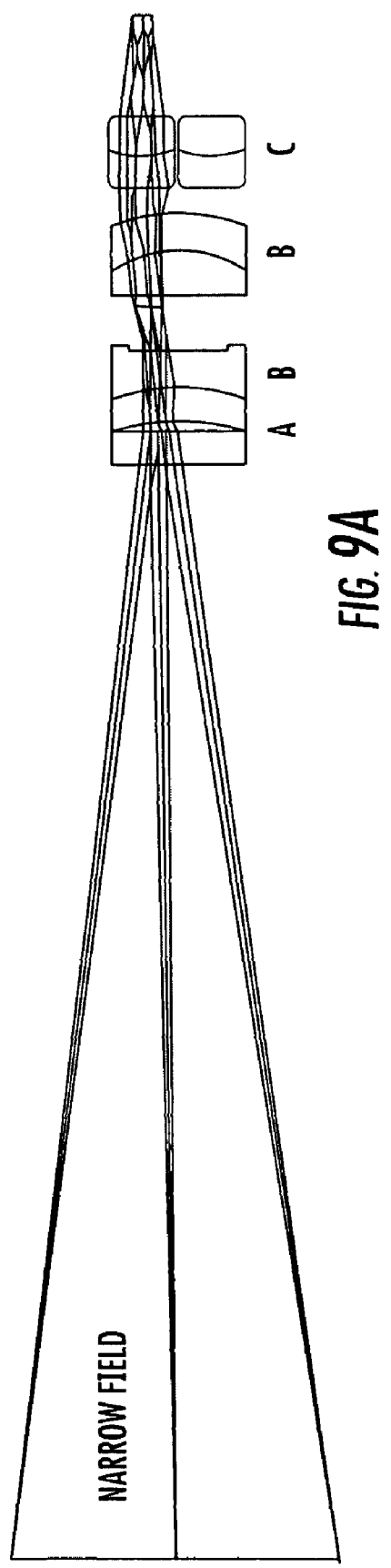
FIGS. 9A and 9B show an optical schematic diagram depicting an objective lens system with a zoom set for a narrow field of view, showing light rays transmitted through the system.
Figure 9B:
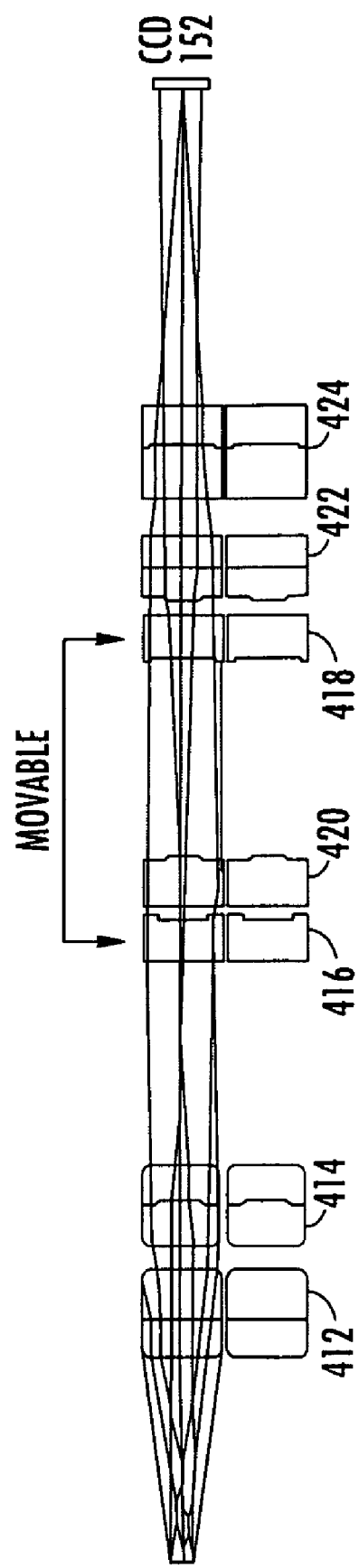

FIGS. 9A and 9B show an optical schematic diagram depicting an objective lens system with a zoom set for a narrow field of view, showing light rays transmitted through the system. The component lenses of the system of FIGS. 9A and 9B are the same as those shown in FIGS. 8A and 8B. Accordingly, a repeated description of them has been omitted.

In the position shown in FIG. 9B, the movable zoom lens 416 is adjacent to the fixed zoom lens 420, and the movable zoom lens 418 is adjacent to the final imaging lens 422. In this position, the movable zoom lenses 416 and 418 and the fixed zoom lens 420 provide a narrow field of view as shown in FIG. 9A.

Table D is a working example of the objective lens system illustrated in FIGS. 8A-9B. Those skilled in the art will appreciate that the lenses of the system define a sequence of optical surfaces, as listed in the table. The units of numerical values and meaning of the column headings are the same as in the tables above. "Diameter" refers to the diameter of the surface in millimeters. FIGS. 10A and 10B, as will be understood by those skilled in the art, show the optical system characteristics (e.g. effective focal length, f/# at the image plane, etc.) corresponding to the working example shown in Table D.

TABLE D

| Surface | Radius | Thickness | Glass | Diameter |
|---|---|---|---|---|
| OBJ | Infinity | 25 | AIR | 20 |
| 1 | Infinity | 0.8 | SILICA | 3 |
| 2 | Infinity | 0.21 | AIR | 3 |
| 3 | −3.864 | 0.8 | SFL6 | 2.5 |
| 4 | −3.965 | 0.8 | LAK8 | 3 |
| 5 | 6.82 | 1 | AIR | 3 |
| 6 | — | 0 | | — |
| STOP | Infinity | 0.3 | AIR | 0.2 |
| 8 | — | 0 | | — |
| 9 | 50.1 | 1 | LAK8 | 3 |
| 10 | −2.687 | 0.8 | SFL6 | 3 |
| 11 | −4.216 | 0.4 | AIR | 3 |
| 12 | — | 0 | | — |
| 13 | Infinity | 0.16 | AIR | 0 |
| 14 | 3.248 | 0.7 | SFL6 | 1.5 |
| 15 | 1.112 | 1 | LAK8 | 1.5 |
| 16 | −3.200443 | 2.266537 | AIR | 1.5 |
| 17 | Infinity | 7.5 | AIR | 1.000848 |
| 18 | 10.18 | 0.5 | SF5 | 1.5 |
| 19 | 3.59 | 1.17 | BK7 | 1.5 |
| 20 | −5.15 | 0.5 | AIR | 1.5 |
| 21 | 6.83 | 0.6 | BK7 | 1.5 |
| 22 | −5.83 | 0.7 | SF5 | 1.5 |
| 23 | Infinity | 0.7 | AIR | 1.5 |
| 24 | −6.59 | 0.8 | BK7 | 1.5 |
| 25 | 6.59 | 3.6 | AIR | 1.5 |
| 26 | Infinity | 0.7 | SF5 | 1.5 |
| 27 | −4.333 | 0.7 | AIR | 1.5 |
| 28 | −6.59 | 0.8 | BK7 | 1.5 |
| 29 | 6.59 | 3.6 | AIR | 1.5 |
| 30 | 2.88 | 0.6 | BK7 | 1.5 |
| 31 | 2.65 | 0.6 | SF4 | 1.5 |
| 32 | 9.665 | 0.7 | AIR | 1.5 |
| 33 | Infinity | 1.1 | BK7 | 1.5 |
| 34 | −1.515 | 0.7 | SF4 | 1.5 |
| 35 | 2.88 | 1.1 | BK7 | 1.5 |
| 36 | −2.88 | 6.672692 | AIR | 1.5 |
| IMAGE | 6.18 | | | 0.7860716 |

Figure 11:
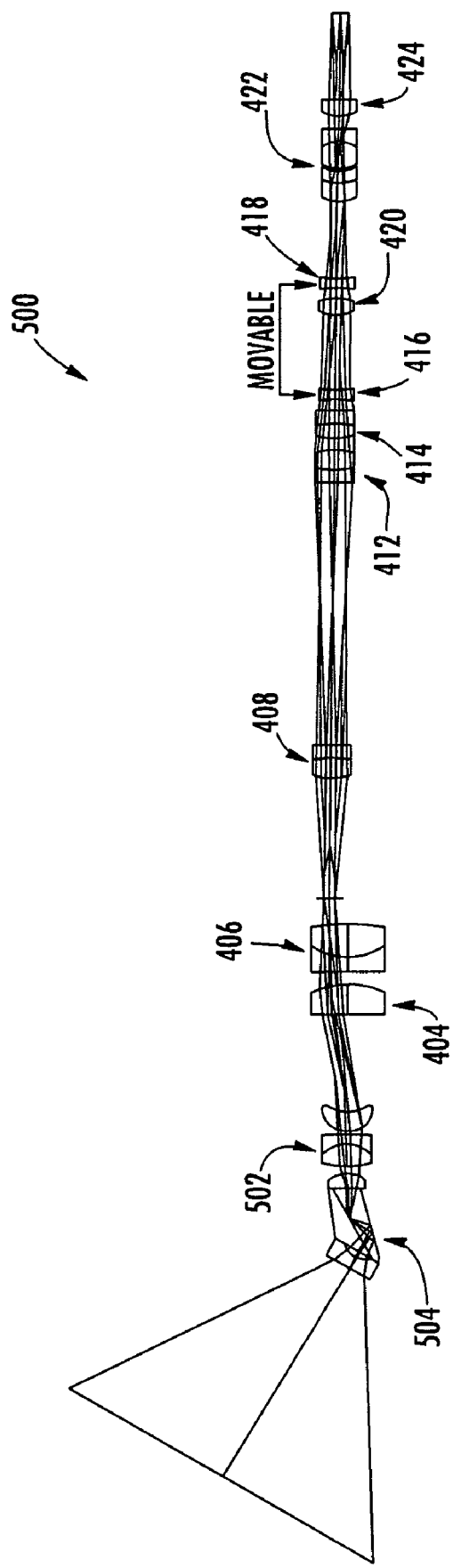
FIG. 11 is an optical schematic diagram depicting an objective lens system with a rotational front, showing light rays transmitted through the system.

FIG. 11 is an optical schematic diagram depicting a lens system 500 of the type shown in FIGS. 8A-9B with the addition of a rotational front, showing light rays transmitted through the system. As shown in FIG. 11, the system includes full diameter objective lenses 404 and 406 and a half-diameter stereo lens pair 408 as shown in FIGS. 8A and 9A (although other collimating and stereo lens combinations as described above can also be used). The system also includes the relay lenses 412 and 414, movable zoom lenses 416 and 418, fixed zoom lens 420, and final imaging lenses 422 and 424 shown in FIGS. 8B and 9B. Note that, for simplicity, only the half diameter optical elements along the right-image optical path are shown.

The system of FIG. 11 also includes a pupil-imaging lens 502 and an angle-reduction telescope 504. The pupil-imaging lens 502 is aligned along the optical axis with objective lenses 404 and 406. The pupil-imaging lens 502 can be configured as a doublet lens and is preferably configured to generate a focal point between itself and the objective lens 404. The angle reduction telescope 504 is also aligned along the optical axis with the objective lenses 404 and 406.

Figure 12:
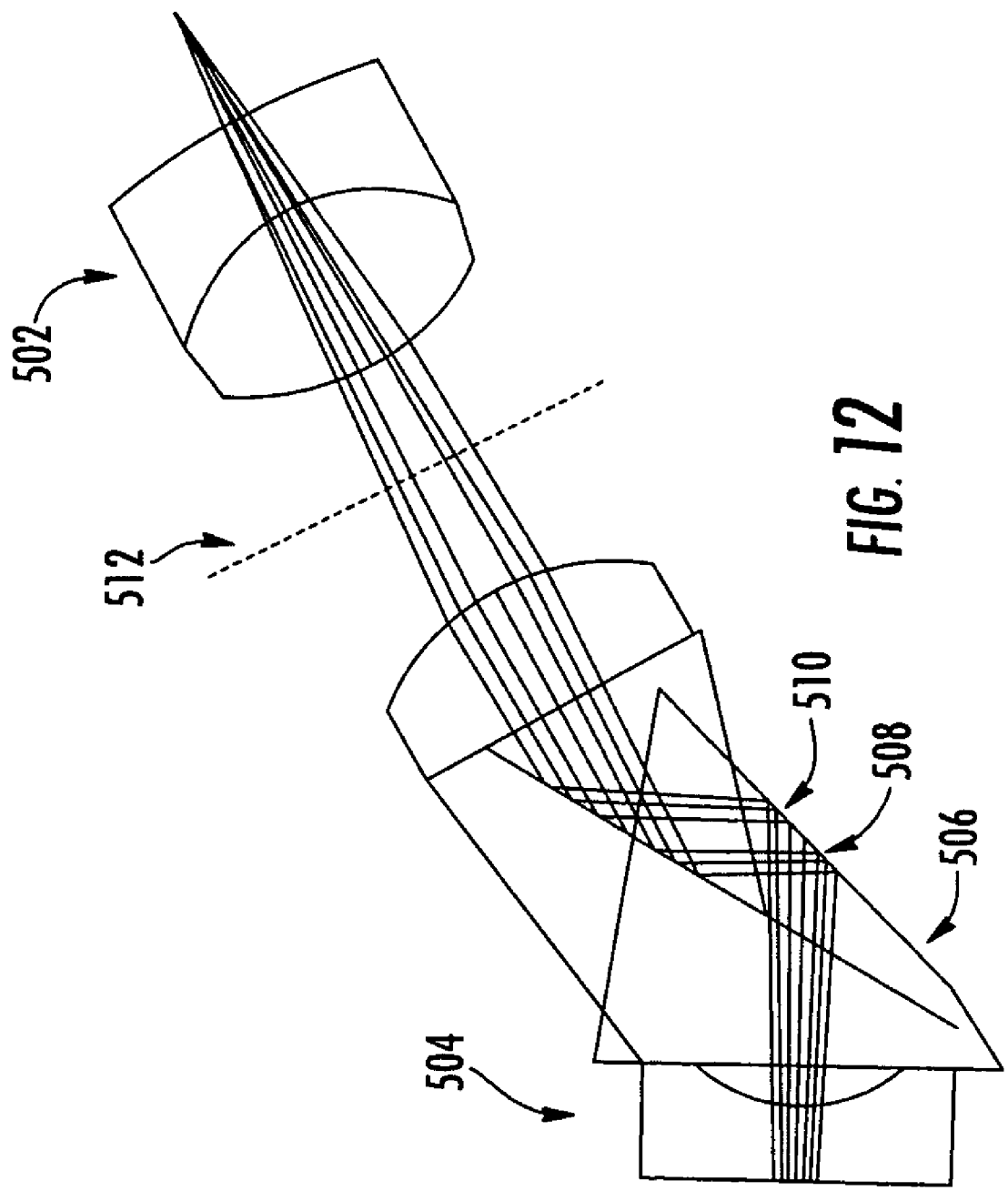
FIG. 12 is an expanded view of the rotational front shown in FIG. 11, showing light rats translated through system.

FIG. 12 shows an expanded view of pupil imaging lens 502 and angle reduction telescope 504. The angle reduction telescope 504 includes a prism 506 in which left three-dimensional pupil 508 and right three-dimensional pupil 510 are formed. The angle reduction telescope 504 is configured to adjust the line of sight through which an object is observed. For example, the line of sight may be angled at 30 degrees from the plane of the system.

The angle reduction telescope 504 is also rotatable in a rotation plane 512 positioned between the angle reduction telescope 504 and the pupil-imaging lens 502. The rotation of the angle reduction telescope 504 enables a user of the system to view different portions of the object of interest.

Figure 12A:
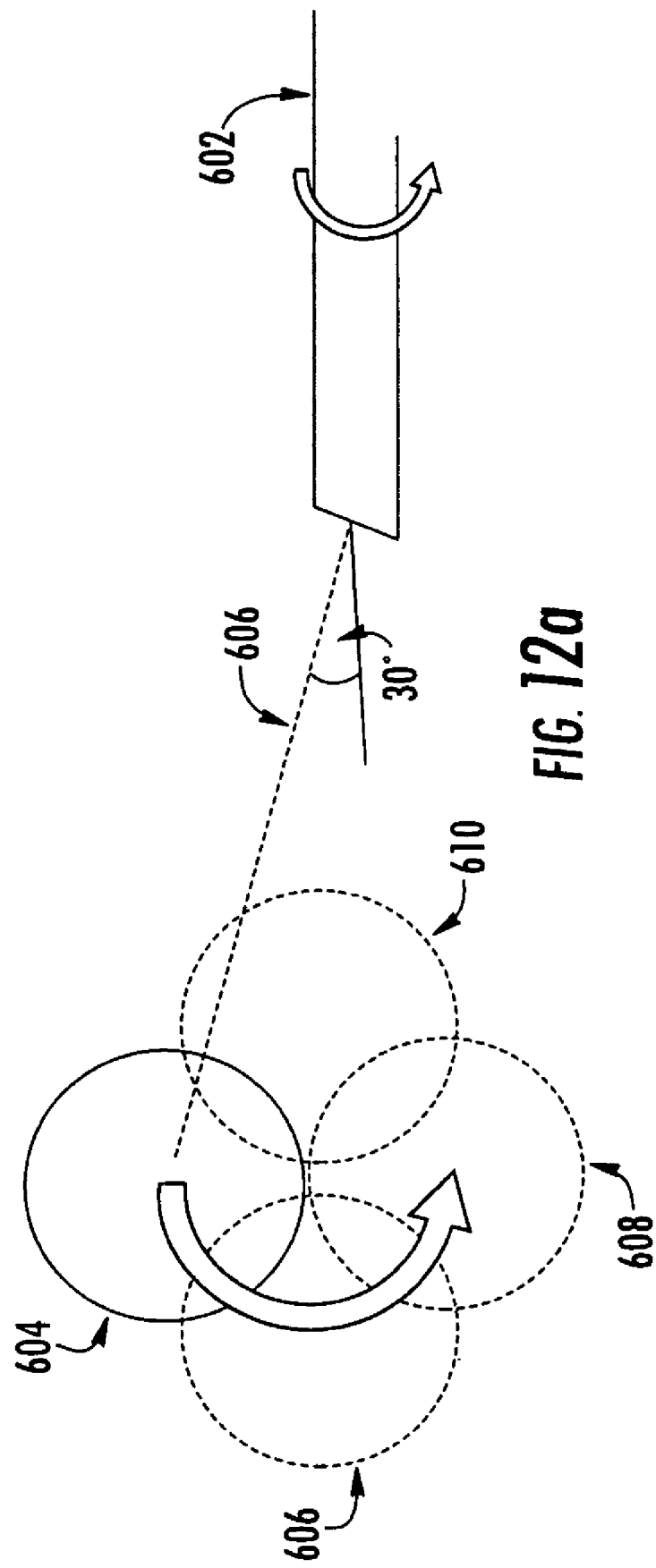
FIG. 12a illustrates the operation of stereo endoscope with a rotatable front end.

FIG. 12a illustrates the operation of a stereo endoscope with a rotatable front end 602 as described above. Initially, the endoscope views field of view 604 along a 30 degree line of sight 606. The front end 602 is then rotated, allowing the user to view, for example, fields of view fields of view 606, 608, and 610. Note that this configuration allows the angle rotation telescope 504 to be rotated without rotating the entire endoscope. This allows the 3D plan of the endoscope to remain fixed, for example, in the horizontal position as is normal and comfortable to human vision Note also that, in the embodiment shown, the rotation plane 512 is located at a position where the light rays from the angle reduction telescope are well collimated, thereby reducing sensitivity to wobble (i.e. deviations from ideal rotation in rotation plane 512).

Figure 13:
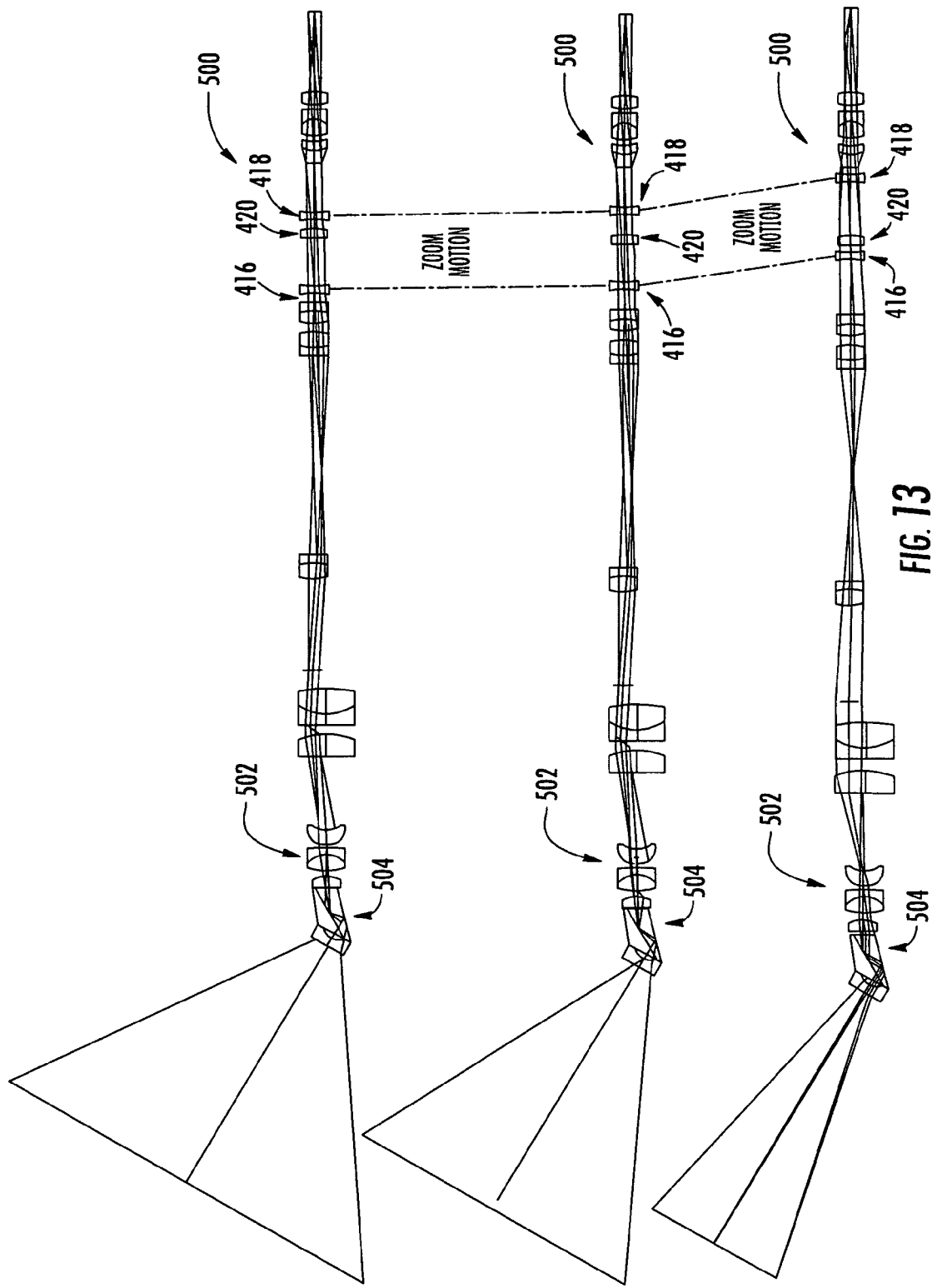
FIG. 13 is an optical schematic diagram illustrating the zoom operation of the objective lens system shown in FIG. 1I.

FIG. 13 shows lens system 500 at three different zoom settings. Note that, for simplicity, only the half diameter optical elements along the right-image optical path are shown. In the topmost schematic, the movable zoom lens 418 is located adjacent to the fixed zoom lens 420. This configuration provides a wide field of view (as shown, 44 mm in diameter). In the middle schematic, the movable zoom lenses 416 and 418 have been moved in fixed relation to one another toward the image end of the lens system 500, providing an intermediately sized field of view (as shown, 32 mm in radius). In the bottom schematic, the movable zoom lenses 416 and 418 have been moved in fixed relation to each other further towards the image end of lens system 500, so that the movable lens 416 is adjacent to the fixed lens 420. This configuration provides a small field of view (as shown 14 mm), and correspondingly high magnification.

Table E is a working example of lens system 500 illustrated in FIG. 11. Those skilled in the art will appreciate that the lenses of the system define a sequence of optical surfaces, as listed in the table. The units of numerical values found in the table and meaning of the column headings are the same as in the tables above. "Diameter" refers to the diameter of the surface in millimeters. FIG. 14, as will be understood by those in the art, shows the optical characteristics corresponding to the working example shown in Table E.

TABLE E

| Surface | Radius | Thickness | Glass | Diameter |
|---|---|---|---|---|
| OBJECT | Infinity | 15 | | 22 |
| 1 | Infinity | 1 | SILICA | 4.05 |
| 2 | 2.165 | 0.51 | AIR | 2.8 |
| 3 | Infinity | 2.2 | LAH58 | 4.05 |

TABLE E-continued

| Surface | Radius | Thickness | Glass | Diameter |
|---|---|---|---|---|
| 4 | — | 0 | | — |
| 5 | Infinity | 0 | MIRROR | 8 |
| 6 | — | -2.3 | | — |
| 7 | — | 0 | | — |
| 8 | Infinity | 0 | MIRROR | 4.4 |
| 9 | Infinity | 0 | LAH58 | 10 |
| 10 | — | 2 | | — |
| 11 | Infinity | 1.2 | S-BSM36 | 3 |
| 12 | -2.86 | 0.6 | AIR | 3 |
| 13 | 6.68 | 1.8 | BASF13 | 4 |
| 14 | -2.86 | 0.8 | PBH11 | 4 |
| 15 | -22.162 | 0.25 | AIR | 4 |
| 16 | 2.164524 | 1.6 | BASF13 | 4 |
| 17 | 2.687 | 8 | AIR | 3.2 |
| 18 | Infinity | 2.5 | SK5 | 6 |
| 19 | -7.58 | 1 | AIR | 6 |
| 20 | 57.357 | 1.2 | SF5 | 6 |
| 21 | 5.203 | 2.8 | SK5 | 6 |
| 22 | -16.778 | 1 | AIR | 6 |
| 23 | — | 1 | AIR | — |
| STOP | Infinity | 10 | AIR | 2 |
| 25 | 7.39 | 1.68 | BK7 | 3 |
| 26 | -5.15 | 1 | SF5 | 3 |
| 27 | -14.62 | 21.53417 | AIR | 3 |
| 28 | 14.62 | 1 | SF5 | 3 |
| 29 | 5.15 | 1.68 | BK7 | 3 |
| 30 | -7.39 | 1 | AIR | 3 |
| 31 | 9.81 | 1.2 | BK7 | 3 |
| 32 | -8.367 | 1 | SF5 | 3 |
| 33 | Infinity | 1 | AIR | 3 |
| 34 | -9.46 | 0.8 | BK7 | 3 |
| 35 | 9.46 | 5.2 | AIR | 3 |
| 36 | Infinity | 1 | SF5 | 2.8 |
| 37 | -6.221 | 1 | AIR | 2.8 |
| 38 | -9.46 | 0.8 | BK7 | 3 |
| 39 | 9.46 | 5.2 | AIR | 3 |
| 40 | 4.089938 | 1.2 | BK7 | 2.7 |
| 41 | 3.795909 | 1.2 | SF4 | 2.7 |
| 42 | 13.63035 | 0.7 | AIR | 2.7 |
| 43 | Infinity | 1.6 | BK7 | 2.7 |
| 44 | -2.161934 | 1 | SF4 | 2.7 |
| 45 | 4.086527 | 1.6 | BK7 | 2.7 |
| 46 | -4.086527 | 8.642132 | AIR | 2.7 |
| IMAGE | Infinity | | | 1.4 |

In various embodiments, the stereo zoom endoscope objective lens systems described above can be constructed so as to provide magnification of three times (3×) or more. In some embodiments, the resolution of the lens system may be substantially diffraction limited over the entire field of view. In some embodiments, the system can also provide constant optical speed (i.e. f/#) at the left and right images. In various embodiments, optical speed of the system at the images can correspond to an f/# of about 8 or greater.

It is to be understood that, in any of the examples presented, any lens or group of lens may be replaces by an equivalent optical element or elements such as, for example, a GRIN lens, a reflective element (e.g., a curved mirror), or diffractive element (e.g., a hologram).

As used herein, the term "optical" is intended to refer not only to the visible spectrum, but also, for example, ultraviolet and infrared light.

A number of embodiments of the invention have been described. Nevertheless, it will be understood that various modifications may be made without departing from the spirit and scope of the invention. Accordingly, other embodiments are in the following claims.

What is claimed is:

1. A stereoscopic lens system for a stereo endoscope, the stereoscopic lens system converting light propagated from an object and received at an objective end of the stereoscopic lens system to left and right optical images at an image plane end of the stereoscopic lens system, comprising:

one or more optical components adapted to collect light from an object and direct first and second portions of the light along a left optical path and a right optical path respectively;

a left group of optical elements having an optical axis disposed along the left optical path and configured to provide a selectably magnified left image of the object at the image plane;

a right group of optical elements having an optical axis disposed along the right optical path and configured to provide a selectably magnified right image of the object at the image plane;

wherein the left and right groups of optical elements each comprise:

at least one fixed zoom lens;

at least one object side movable zoom lens proximate the object end, and linearly movable along the optical axis;

at least one image side movable zoom lens proximate the image plane, and linearly movable along the optical axis, the at least one object side movable zoom lens and the at least one image side movable zoom lens being selectably movable in the direction of the optical axis while maintaining a fixed separation in the direction of the optical axis in relation to each other;

wherein the at least one fixed zoom lens, the at least one object side movable zoom lens, and the at least one image side movable zoom lens, are characterized by fixed optical power, and wherein the magnification and field of view of the left image and the magnification and field of view of the right image depend on the position of the movable zoom lenses of said left group of optical elements and right group of optical elements, respectively.

2. A stereoscopic lens system according to claim 1, wherein the at least one object side movable zoom lens and the at least one image side movable zoom lens of the left group of optical elements are movable in fixed relationship to the at least one object side movable zoom lens and the at least one image side movable zoom lens of the right group of optical elements.

3. A stereoscopic lens system according to claim 1, wherein the at least one object side movable zoom lens and the at least one image side movable zoom lens of the left group of optical elements and the at least one object side movable zoom lens and at least one image side movable zoom lens of the right group of optical elements are affixed to a selectably movable platform.

4. A stereoscopic lens system according to claim 1, wherein, for each of the left group of optical elements and the right group of optical elements, the at least one fixed zoom lens comprises a positive lens, the at least one object side lens comprises a negative lens, and the at least one image side lens comprises a negative lens.

5. A stereoscopic lens system according to claim 1, wherein corresponding portions of the left and right images are mapped to within a selected distance of each other at the image plane.

6. A stereoscopic lens system according to claim 5, wherein the one or more optical elements adapted to collect light from an object and direct first and second portions of the light along a left optical path and a right optical path comprises:

at least one collimator lens proximate the objective end for collecting and substantially collimating light from points on the object;

at least one right stereo lens and at least one left stereo lens adjacent to the collimator lens for collecting light from the collimator lens, the optical axis of the right and left stereo lenses being substantially parallel to the optical axis of the collimator lens, the collimator lens and the right and left stereo lenses being arranged so that the collimator lens provides equal-angle light ray pairs from symmetrically disposed object points to the right and left stereo lenses.

7. A stereoscopic lens system according to claim 6, further comprising:

a cover glass adjacent the at least one collimator lens and proximate the objective end.

8. A stereoscopic lens system according to claim 7, wherein the cover glass comprises fused silica.

9. A stereoscopic lens system according to claim 7, wherein the cover glass is scratch resistant.

10. A stereoscopic lens system according to claim 6 further comprising:

at least one left relay lens positioned along the left optical path; and at least one right relay lens positioned along the right optical path.

11. A stereoscopic lens system according to claim 10, wherein the at least one right relay optical lens is positioned between the at least one right stereo lens and the right group of optical elements, and wherein the at least one left relay optical lens is positioned between the at least one left stereo lens and the left group of optical elements.

12. A stereoscopic lens system according to claim 10, wherein the at least one right relay optical lens is configured to relay a pupil from a position adjacent to the at least one right stereo lens into the right group of optical elements, and wherein the at least one left relay optical lens is configured to relay a pupil from a position adjacent to the at least one left stereo lens into the left group of optical elements.

13. A stereoscopic lens system according to claim 6, further comprising a pupil-imaging lens aligned along the optical axis of the least one collimator lens and positioned closer to the objective end than the at least one collimator lens; and an angle reduction telescope aligned along the optical axis with the at least one collimator lens and positioned closer to the objective end than the pupil-imaging lens, the angle reduction telescope configured to provide an angled line of sight.

14. A stereoscopic lens system according to claim 13, wherein the angle reduction telescope is configured to be rotatable in a rotation plane positioned between the angle reduction telescope and the pupil-imaging lens.

15. A stereoscopic lens system according to claim 1, further comprising:

at least one right imaging lens configured to receive light from the right group of optical elements and to provide the right image at the image plane; and at least one left imaging lens configured to receive light from the left group of optical elements and to provide the left image at the image plane.

16. A stereoscopic lens system according to claim 1, wherein the left group of optical elements and the right group of optical elements each comprise first and second linearly movable zoom lenses positioned on opposing sides of a fixed zoom lens and movable in fixed relation to each other.

17. A stereoscopic lens system according to claim 1, further comprising an angle reduction telescope configured to provide an angled line of sight.

18. A stereoscopic lens system according to claim 1, wherein the at least one linearly movable left optical element and the at least one linearly movable right optical are configured provide at least three times magnification of the object at the left image and the right image respectively.

19. A stereoscopic lens system according to claim 1, wherein the lens system is configured to provide the left and right optical images with substantially diffraction limited resolution across the field of view of the endoscope.

* * * * *